Nov. 9, 1954      E. B. ANDERSON      2,693,638
METHOD OF MAKING KEYS FOR FRANGIBLE STRIP
Filed May 14, 1953      2 Sheets-Sheet 1
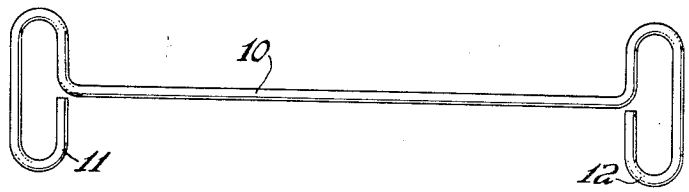
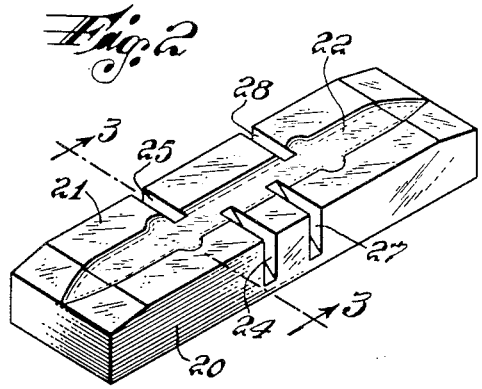
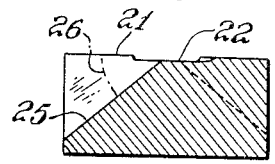
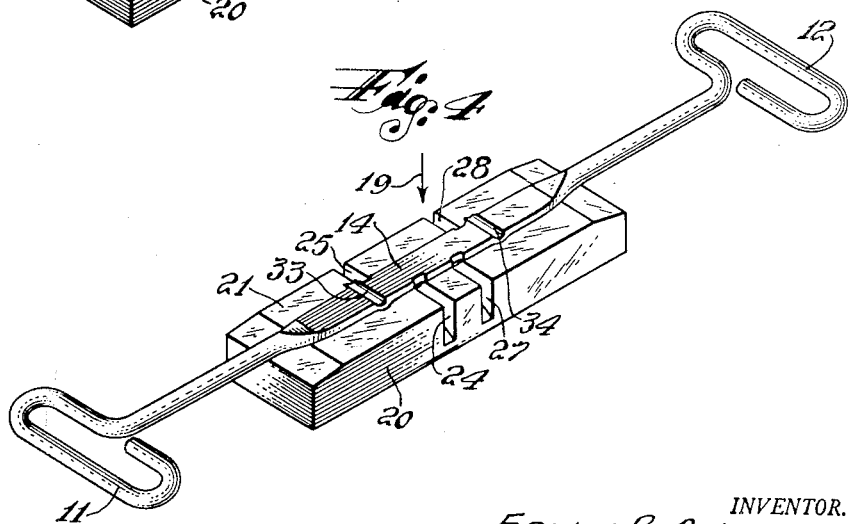
INVENTOR.
EDWIN B. ANDERSON
BY
*Harry Hummer*
ATTORNEY Nov. 9, 1954  E. B. ANDERSON  2,693,638
METHOD OF MAKING KEYS FOR FRANGIBLE STRIP
Filed May 14, 1953  2 Sheets-Sheet 2
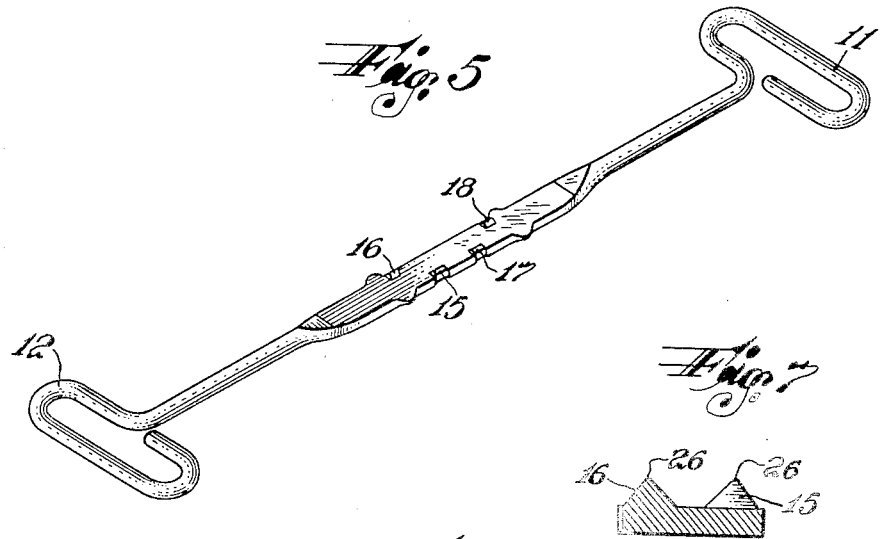
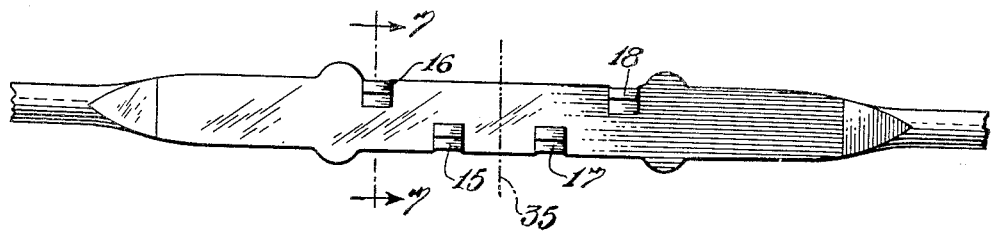
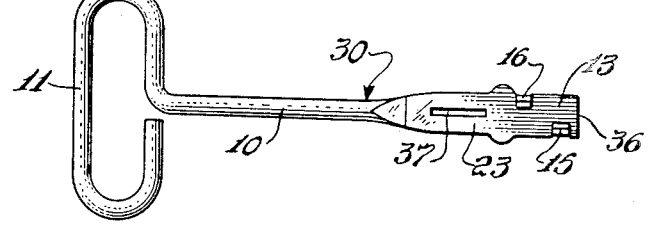
INVENTOR.
EDWIN B. ANDERSON
BY
ATTORNEY United States Patent Office 2,693,638
Patented Nov. 9, 1954

2,693,638
METHOD OF MAKING KEYS FOR FRANGIBLE STRIP

Edwin B. Anderson, Point Pleasant Beach, N. J., assignor to Eastern Tool & Mfg. Co., Belleville, N. J., a corporation of New Jersey Application May 14, 1953, Serial No. 354,974

2 Claims. (Cl. 29—552)

This invention relates to improvements in the method of manufacturing keys such as are used for separation of frangible strips used for vacuum sealing of the contents of cans and for similar purposes.

Pursuant to the present invention, a key is provided having sharply pointed welding protuberances so that when the key is disposed on the surface to which it is to be welded, the sharply pointed protuberances will cut through the paint, rust, and other surface coatings and impurities, to penetrate to the clean, bare metal beneath, to provide clean contact for a better and more homogeneous weld.

The objective above noted is preferably attained by the use of a die having a medially longitudinally depressed face on which the key shank is adapted to be disposed in position for being subjected to pressure, forcing it against the face of the die. The die is provided with slots preferably cut at an acute angle to the face of the die and so disposed as to intersect marginally the longitudinally depressed portion of the upper face of the die. By this arrangement, when the key shank is subjected to pressure against the face of the die, the marginal metal of the key shank will flow into the slots, thereby forming very sharply pointed weld protuberances. The slots referred to are preferably formed at staggered points so as to locate the protuberances at staggered points, to further strengthen the construction and the weld effect attained.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is a plan view of a blank from which the key of the invention is to be formed, Fig. 2 is a perspective view of a die which may be used in carrying out the method of the invention, and in forming the key pursuant to the invention, Fig. 3 is a vertical sectional view, taken on line 3—3 of Fig. 2, Fig. 4 is a perspective view thereof, showing the key blank positioned on the die and formed pursuant to the method of the invention thereon, Fig. 5 is a perspective view of the completed key formed in accordance with the invention, showing that face thereof, which, in Fig. 4 is turned downwardly on the die, Fig. 6 is an enlarged, fragmentary, medial plan view thereof, Fig. 7 is a vertical sectional view, taken on line 7—7 of Fig. 6, and Fig. 8 is a plan view of the key completed in accordance with the invention.

As shown in the drawings, the key of the invention is made from a blank or length 10 of wire which is bent at one end to define a handle 11 to facilitate manipulation of the key in the final form thereof (Fig. 8). The blank 10 is positioned on a die 21 which is preferably provided with a medial longitudinally depressed portion 22 of the outline to be assumed by the shank portion 23 of the finished key 30. The die is provided with slots which intersect the marginal edges of the depressed portion 22 of the die face at acute angles thereto, as indicated at 26 of Fig. 3.

Pressure is then brought to bear by the use of a suitable tool or other force moving in the direction of arrow 19 (Fig. 4) from a point above the die and onto the blank 10 to compress the latter on the top surface of the die, flattening the blank and causing the marginal portions thereof, at the slots 24, 25 of the die, to flow thereinto, thus forming the sharply pointed triangularly shaped protuberances 15, 16 having the very pronounced pointed peaks or apices 26 (Fig. 7) for the purpose above mentioned. The marginal material of the medial portion 14 of the blank, in the operation just described, flows under pressure into the slots, thus building up the very sharply pointed protuberances above mentioned. In the preferred method of manufacture, illustrated in the drawings, two key blanks are formed simultaneously by providing the die with a second set of slots 27, 28 and extending the depressed portion 22 of the upper face of the die there along whereby the single blank 10 of the general initial form indicated in Fig. 1 may be positioned on the die and, by the single operation, the two key blanks will be formed. These blanks may later be separated medially of the length of the blank, as indicated at 35 of Fig. 6, to provide two separate identical keys of the desired outline shown in Fig. 8 to facilitate separation of the key from the can or other object to which the same is welded.

The key is provided with transversely creased or weakened parts 33, 34 spaced between the protuberances and slot 37 of the key, to facilitate the ultimate consumer breaking the key by bending the same at the weakened point 33 or 34, that end of the key having been previously welded to the can.

The key is provided with slots 37 to receive the frangible strips of the cans or other objects in connection with which the key is to be used, to facilitate winding said frangible strips around the key for the purpose of opening such objects. It will be apparent that the invention is adapted to be used for the provision of keys intended for any desired use which are to be secured to objects by welding the same thereto, and that the method and structure set forth provides a key having sharply pointed protuberances particularly suited for the purpose, located marginally and in staggered relation to further enhance their structural advantages.

Having thus described my invention, what I claim as new and desire to secure by Letters Patent is:

1. The method of forming a key from a single blank of wire, which comprises providing a generally rectangular die having an elongated depression in the upper face thereof of greater width than said blank, and a slot opening through each side and an adjacent portion of the upper face and having a bottom wall at an acute angle to said upper face and intersecting said depressed portion, positioning the blank in said depression in the die, and then applying pressure to the blank in a direction normal to said upper face causing the material of the blank to flow marginally into said depression and thereby into said slots in the formation of a flattened body portion and sharply pointed marginal protuberances for welding purposes.

2. The method according to claim 1, wherein said die is provided with a second pair of slots spaced longitudinally of the die from said first slots and whereby a pair of keys are provided by a single pressure operation with the unitary ends of the keys disposed between the two pairs of slots.

References Cited in the file of this patent

UNITED STATES PATENTS

| Number | Name | Date |
|---|---|---|
| 1,170,676 | Safford | Feb. 8, 1916 |
| 2,258,610 | Hothersall | Oct. 14, 1941 |
| 2,277,758 | Hawkins | Mar. 31, 1942 |
| 2,283,210 | Hunter | May 19, 1942 |
| 2,326,806 | Shmurak | Aug. 17, 1943 |
| 2,478,962 | Ziehmer, Jr. | Aug. 16, 1949 |
| 2,557,773 | Steinman | June 19, 1951 |
| 2,637,465 | Fisher | May 5, 1953 |